Aug. 11, 1925.

J. W. HARDWICK 1,549,305

LUBRICATING MECHANISM FOR INTERNAL COMBUSTION ENGINES

Filed April 10, 1922

Inventor
J. W. Hardwick

Patented Aug. 11, 1925.

1,549,305

UNITED STATES PATENT OFFICE.

JAMES W. HARDWICK, OF HUMBIRD, WISCONSIN.

LUBRICATING MECHANISM FOR INTERNAL-COMBUSTION ENGINES.

Application filed April 10, 1922. Serial No. 551,218.

*To all whom it may concern:*

Be it known that I, JAMES W. HARDWICK, a citizen of the United States, residing at Humbird, in the county of Clark and State of Wisconsin, have invented certain new and useful Improvements in a Lubricating Mechanism for Internal-Combustion Engines; and I do hereby declare the following to be a full, clear and exact description of the invention, such as will enable others skilled in the art to which it appertains to make and use the same.

This invention relates to a lubricating mechanism for internal combustion engines.

It is aimed to provide means whereby the transmission of an automobile or the like, particularly the Ford type, may have the lubricant circulate without the aid of a pump in order to be subject to the cooling influence of the atmosphere, and accordingly such a means as will be inexpensive as well as durable and efficient.

Another object is to provide an attachment for the transmission casing in such an engine which will consist of a tank and conduits connecting the transmission and the tank and disposed at different elevations.

Additional objects and advantages will become apparent from a consideration of the description following taken in connection with accompanying drawings illustrating one practical embodiment.

In said drawings:—

Figure 1:
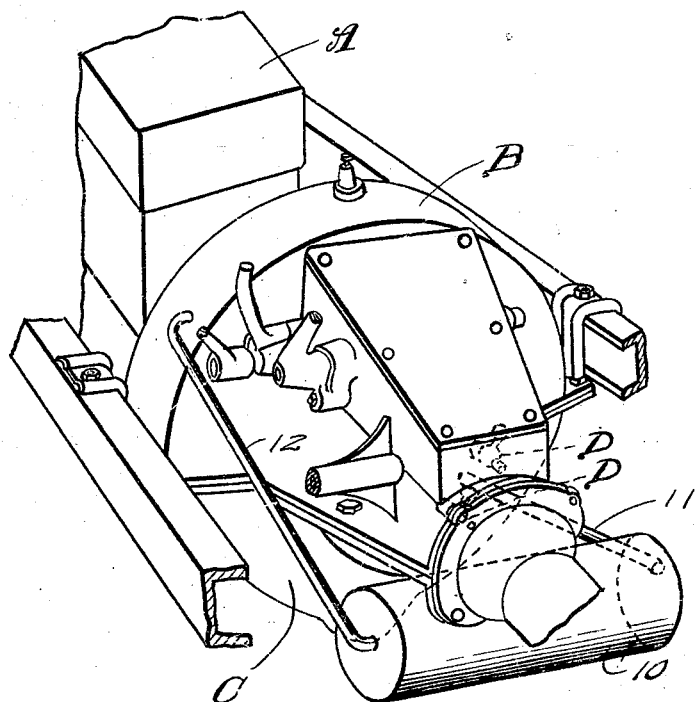
Figure 2:
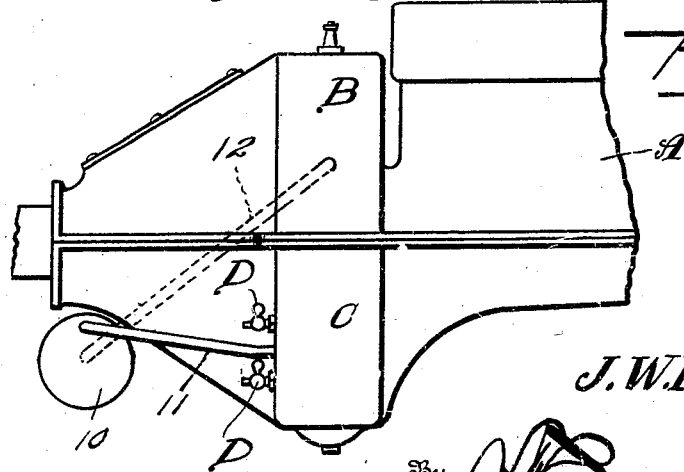

Figure 1 is a view in perspective of a portion of an engine of the internal combustion type having my improvement associated therewith, and Figure 2 is a side elevation of the same.

In said drawings, at A an internal combustion engine is conventionally shown which has its transmission case at B, the lower portion of which at C serves as an oil or lubricant reservoir in which movable parts of the engine or motor operate and splash the lubricant to different parts to be lubricated. This transmission casing may have pet cock valves at D, arranged at different levels as in the Ford motor and adapted to be opened to determine the quantity of oil contained in the reservoir C.

In carrying out my invention, a tank or receptacle of suitable size and shape is provided at 10 and is secured to any suitable part of the propelling engine or adjacent structure of an automobile. In actual practice, I find a tank 10 adapted to contain about one gallon of oil to work efficiently with a Ford motor.

A pipe or conduit 11 extends from the tank 10 to the transmission case B, preferably being secured thereto and communicating with its interior intermediate the pet cocks D. Another oil conduit or pipe is employed at 12 which communicates with the interior of the transmission casing D adjacent the top and with the reservoir C, as at one side thereof.

In operation, sufficient oil or lubricant is supplied to the transmission case B to fill it to the desired level and to fill the tank 10. As the motor operates, the traveling parts within the transmission case B will splash oil in the reservoir C into the pipe 12 which thereupon flows into the tank 10 and from the tank 10 through the pipe or conduit 11 back to the transmission case. In this way, the oil is effectively circulated and subjected to the cooling influence of the atmosphere. The circulation of the oil also is insured by the agitation due to the pressure produced within the engine through the operation of its pistons and the vibration and jolting of the automobile as a whole.

As merely one practical embodiment has been illustrated and described, it is to be understood that changes in the details may be resorted to provided they fall within the spirit and scope.

I claim as my invention:—

In an internal combustion engine, in combination with a case in which lubricant is splashed through operation of the engine, an auxiliary lubricant tank transversely disposed exteriorly of the case in compact relation to the engine and under the latter and offset from and substantially out of contact with the case so as to be subject to the cooling influence of the atmosphere substantially completely about its exterior, an elongated conduit exteriorly of the case which splashing lubricant enters at a relatively high point, said conduit being in communication with the tank above the base of the latter, and an elongated return pipe in communication with the tank above its base and with said case at a point lower than said point to return the lubricant by gravity, said conduit and pipe being at different angles and causing the oil to travel in a relatively fine stream to assist in cooling it.

In testimony whereof I affix my signature in presence of two witnesses.

JAMES W. HARDWICK.

Witnesses:
 B. J. STALLARD,
 HOWELL A. STUNE.